(12) United States Patent
Inuganti et al.

(10) Patent No.: US 12,621,130 B2
(45) Date of Patent: May 5, 2026

(54) BASE STATION STATE DETECTION FOR CLIENT COMPUTING DEVICES

(71) Applicant: ZEBRA TECHNOLOGIES CORPORATION, Lincolnshire, IL (US)

(72) Inventors: Venkata Aneel Kumar Inuganti, Bangalore (IN); Mahesh Kumar Edar, Davenagere (IN); Darpan Majumder, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 177 days.

(21) Appl. No.: 18/233,423

(22) Filed: Aug. 14, 2023

(65) Prior Publication Data

US 2025/0062894 A1 Feb. 20, 2025

(51) Int. Cl.
*H04L 9/08* (2006.01)
*H04W 12/037* (2021.01)

(52) U.S. Cl.
CPC ............ *H04L 9/0827* (2013.01); *H04L 9/088* (2013.01); *H04W 12/037* (2021.01)

(58) Field of Classification Search
CPC ..... H04L 9/0827; H04L 9/088; H04W 12/037
See application file for complete search history.

(56) References Cited

U.S. PATENT DOCUMENTS

| | | | | |
|---|---|---|---|---|
| 10,674,365 | B1 * | 6/2020 | Kamkar | H04W 12/082 |
| 10,778,432 | B2 * | 9/2020 | Leavy | H04L 9/50 |
| 10,855,440 | B1 * | 12/2020 | Alwen | H04L 9/0894 |
| 10,979,404 | B2 * | 4/2021 | Le Van Gong | H04L 63/068 |
| 11,101,999 | B2 * | 8/2021 | Leavy | H04L 9/0643 |
| 11,496,419 | B2 * | 11/2022 | He | H04L 49/552 |
| 11,736,484 | B2 * | 8/2023 | Nathanson | H04L 63/0414 |
| 11,979,498 | B2 * | 5/2024 | Nelson | H04L 9/12 |
| 12,069,164 | B2 * | 8/2024 | Raza | H04L 9/0891 |
| 2017/0244685 | A1 * | 8/2017 | Mirza | H04L 9/14 |
| 2020/0007519 | A1 * | 1/2020 | Thorpe | H04L 63/166 |
| 2021/0120038 | A1 * | 4/2021 | Compagno | H04L 63/0435 |
| 2022/0060452 | A1 * | 2/2022 | Kosbab | G06F 21/552 |
| 2022/0407693 | A1 * | 12/2022 | Howell | H04L 9/0894 |
| 2023/0232224 | A1 * | 7/2023 | Hamblet | H04W 12/72 726/2 |
| 2023/0275751 | A1 * | 8/2023 | Sneider | H04L 9/3242 713/176 |

* cited by examiner

*Primary Examiner* — Viral S Lakhia

(57) ABSTRACT

A method in a computing device includes: establishing an association with a base station; initiating a handshake with the base station to obtain an encryption key; prior to transmitting content data associated with an application executing at the computing device, transmitting a test message to the base station, the test message containing a payload distinct from the content data; determining, based on a message received from the base station after transmission of the test message, whether the base station has completed installation of the encryption key; and in response to determining that the base station has completed installation of the encryption key, transmitting the content data to the base station using the encryption key.

20 Claims, 5 Drawing Sheets

BASE STATION STATE DETECTION FOR CLIENT COMPUTING DEVICES

BACKGROUND

Initiating wireless communications between a client computing device and a base station, e.g., within a wireless local area network (WLAN), can include generating one or more encryption keys used to encrypt subsequent communications between the client device and the base station. A delay between generation of the encryption key(s) and installation of the encryption keys, however, can affect communications performance between the client device and the base station.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
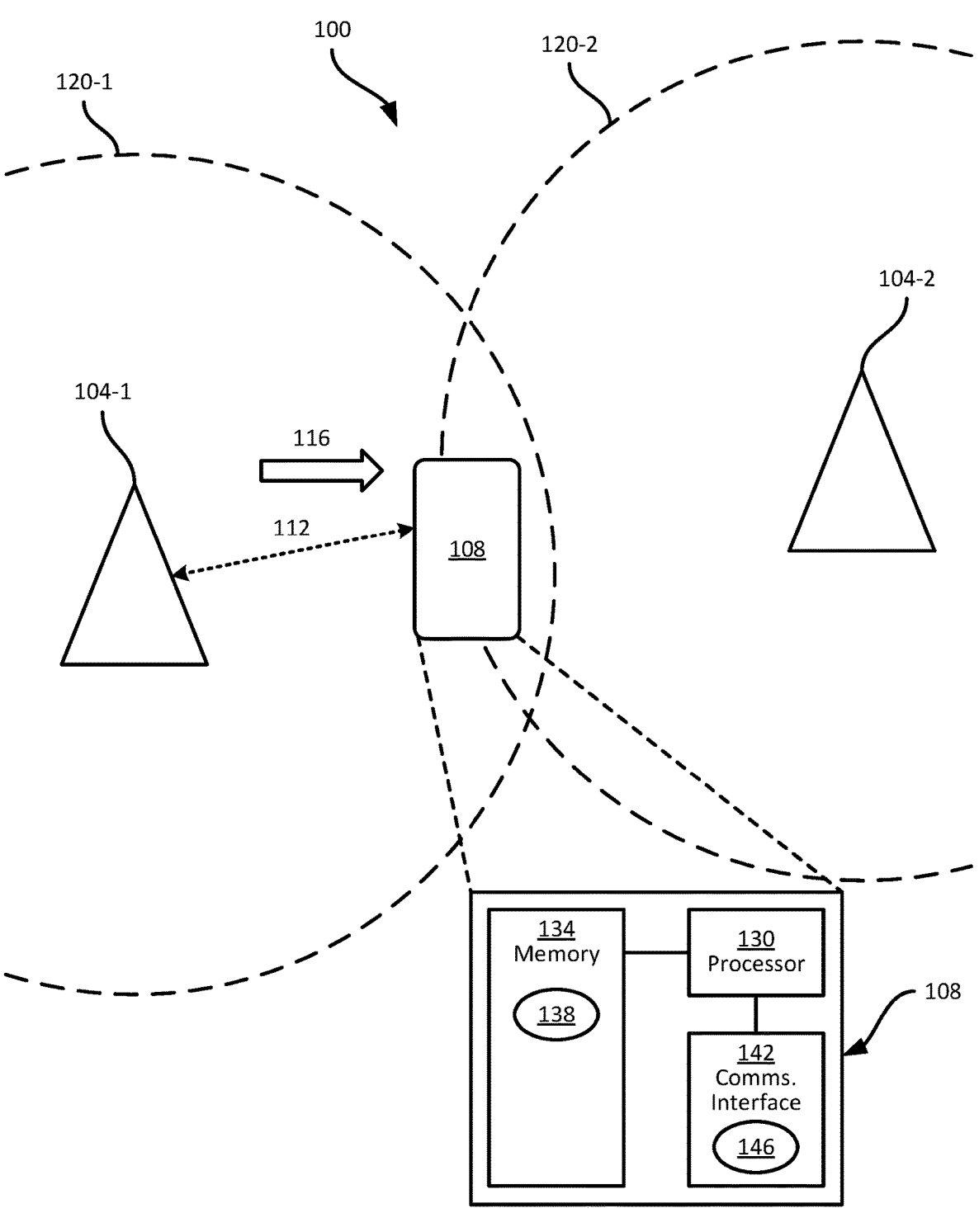
FIG. 1 is a diagram of a wireless communications system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a computing device, comprising: establishing an association with a base station; initiating a handshake with the base station to obtain an encryption key; prior to transmitting content data associated with an application executing at the computing device, transmitting a test message to the base station, the test message containing a payload distinct from the content data; determining, based on a message received from the base station after transmission of the test message, whether the base station has completed installation of the encryption key; and in response to determining that the base station has completed installation of the encryption key, transmitting the content data to the base station using the encryption key.

Additional examples disclosed herein are directed to a computing device, comprising: a wireless communications interface; and a controller configured to: establish an association with a base station; initiate a handshake with the base station to obtain an encryption key; prior to transmitting content data associated with an application executing at the computing device, transmit a test message to the base station, the test message containing a payload distinct from the content data; determine, based on a message received from the base station after transmission of the test message, whether the base station has completed installation of the encryption key; and in response to determining that the base station has completed installation of the encryption key, transmit the content data to the base station using the encryption key.

FIG. 1 illustrates a wireless communications system 100, deploying one or more wireless networks, such as wireless local area networks (WLANs) based on the Institute of Electrical and Electronics Engineers (IEEE) 802.11 family of standards (e.g., one or more Wi-Fi™ networks). The system 100 can also deploy one or more wide-area wireless networks (WWAN), such as a cellular network or the like, in addition to or instead of one or more WLAN. The system 100 includes at least one base station, such as a WLAN base station, a cellular base station, or the like. As shown in FIG. 1, the system 100 includes base stations 104-1 and 104-2. In this example, the base stations 104-1 and 104-2 implement one or more WLANs, e.g., based on the IEEE 802.11 standards, and are therefore also referred to herein as access points 104-1 and 104-2. The access points 104-1 and 104-2 are referred to collectively below as the access points 104, and generically as an access point 104 (similar nomenclature may also be used for other numbered components with dashed suffixes). The system 100 can include more than two access points 104 in other examples, or only one access point 104.

Each AP 104 can include an enclosure housing one or more controllers, transceivers, antenna assemblies, and the like. A given network, identified by a service set identifier (SSID), can be implemented by a plurality of APs 104. For example, the APs 104 can implement a WLAN with a given SSID, e.g., to extend the coverage area of the WLAN beyond the coverage area achievable with a single AP 104. Client devices within the network, such as a wireless computing device 108 (e.g., a mobile computer, a smartphone, a mobile printer, a barcode scanner, a tablet computer, or the like), can roam between the APs 104 implementing the network, e.g., according to signal strength, congestion, band preferences at the client device 108, and the like.

The client device 108 is illustrated as having established a connection 112 with the AP 104-1. As the device 108 travels, e.g., in a direction 116, the device 108 may approach an outer extent of a coverage area 120-1 (e.g., an area or volume over which the device 108 can establish a reliable connection with the AP 104-1) associated with the AP 104-1, and enter a coverage area 120-2 associated with the AP 104-2. When the device 108 approaches the outer extent of the coverage area 120-1 and enters the coverage area 120-2, the device 108 may detect a roaming condition (also referred to as a roam trigger), such as a reduction in signal strength (e.g., a Received Signal Strength Indicator, or RSSI) from the AP 104-1. In response to detecting the roam trigger, the device 108 can collect data identifying other access points, such as the AP 104-2, to be evaluated as candidates for roaming. Each other AP 104 may have a distinct identifier (e.g., a Basic Service Set Identifier or BSSID). The identifier of each AP 104 can include a Media Access Control (MAC) address. Having collected the data identifying candidate APs 104 for roaming, the device 108 can be configured to select a destination AP 104 for roaming, according to various factors such as the capabilities supported by each AP 104, signal strength associated with each AP 104, and the like.

Certain internal components of the device 108 are also illustrated in FIG. 1. The device 108 includes a processor 130, such as a central processing unit (CPU), graphics processing unit (GPU), application-specific integrated circuit (ASIC), or the like, communicatively coupled with a non-transitory computer-readable storage medium such as a memory 134, e.g., a combination of volatile memory elements (e.g., random access memory (RAM)) and non-volatile memory elements (e.g., flash memory or the like). The memory 134 stores a plurality of computer-readable instructions in the form of applications, including in the illustrated example a wireless communications application 138 whose execution by the processor 130 configures the device 108 to transmit and/or receive application data via the network(s) implemented by the APs 104. The wireless communications application 138 can include a web browser, a voice call application, a video call application, or the like.

Via execution of the wireless communications application 138, the device 108 can be configured to generate data, referred to below as application data, and transmit the data to an AP 104, e.g., for transmission to another computing device either within or outside the network(s) implemented by the APs 104. The device 108 can also be configured, via the application 138, to receive and process application data from the other computing device. The other computing device can be another client device executing another instance of the application 138 (e.g., in the case of a voice call). In other examples, the other computing device can include a server, e.g., configured to collect data transmitted by the device 108. The application data can therefore include content such as media (e.g., audio, video), but can also include other types of content than media, e.g., web browsing data and the like.

The device 108 also includes a communications interface 142, enabling the device 108 to establish connections with networks such as the WLAN implemented by the APs 104. The communications interface 142 can include any suitable combination of transceivers, antenna elements, and corresponding control hardware enabling communications with the APs 104. The communications interface 142 stores and executes, in the illustrated example, a network controller application 146, which can be implemented as firmware executable by a controller of the interface 142, as dedicated controller hardware, or the like. The application 146, when executed by the interface 142, configures the interface 142 to perform various functionality related to the establishment and management of connections such as the connection 112 between the device 108 and APs 104. As described below, the functionality implemented by the application 146 also includes the transmission of one or more test messages in response to roaming from one AP 104 to another AP 104, to mitigate loss of application data resulting from incomplete installation of encryption keys at an AP 104.

In some examples, the application 146 resides within the communications interface 142 as noted above. The processor 130, memory 134, and communications interface 142 can be implemented as components of a system-on-chip (SoC) assembly in some examples, and the processor 130 and interface 142 may share processing resources. In the discussion below, it will be understood that functions described as being performed by the device 108 or by the processor 130 can be performed by either or both of the processor 130, and a controller of the communications interface 142. The processor and the wireless communications interface 142 (including any dedicated control hardware of the interface 142) may also be referred to as "a controller".

The device 108 can include further components (not shown), including output devices such as a display, a speaker, and the like, as well as input devices such as a keypad, a touch screen, a microphone, and the like.

To communicate over the WLAN implemented by the APs 104, e.g., with another computing device as noted above, the device 108 can be configured to transmit application data (e.g., audio, video, or the like) to an AP 104, e.g., for further transmission to the other computing device, and to receive application data from the other computing device via the AP 104. When the device 108 roams, e.g., from the AP 104-1 to the AP 104-2, application data generated via the application 138 may be buffered at the device 108 for a certain period of time during which the device 108 establishes an association with the AP 104-2 and performs a handshake operation to generate one or more encryption keys (e.g., a unicast or pairwise key, and a broadcast or group key). Once generated, the encryption key(s) are employed at the device 108 to encrypt the application data prior to transmission from the computing device 108.

Before using the encryption key(s) for communications, each of the device 108 and the AP 104 are configured to install the encryption key(s). For example, the device 108 can be configured to add the key(s) to one or more registries or other data structures in the memory 134 or storage circuits of the communications interface 142. The AP 104 may perform a similar installation process. Under certain conditions, the device 108 and/or an AP 104 may experience a delay between the generation of an encryption key (e.g., the completion of the above-mentioned handshake operation) and the installation of the key. For example, the AP 104-2 may experience a delay between conclusion of the handshake operation and completion of key installation, due to the computational load imposed on the AP 104-2 by other processes (e.g., other network connections managed by the AP 104-2) or the like. In such situations, the AP 104-2 may be prevented from using the key(s) to encrypt and decrypt communications with the device 108. However, if the device 108 has completed key installation, the device 108 may resume sending application data to the AP 104-2. The AP 104-2, until key installation is complete, may discard application data from the device 108 because the application data cannot be processed without installed encryption keys. Communications sessions such as voice calls and the like may therefore experience periods of reduced performance when the device 108 roams.

Figure 2:
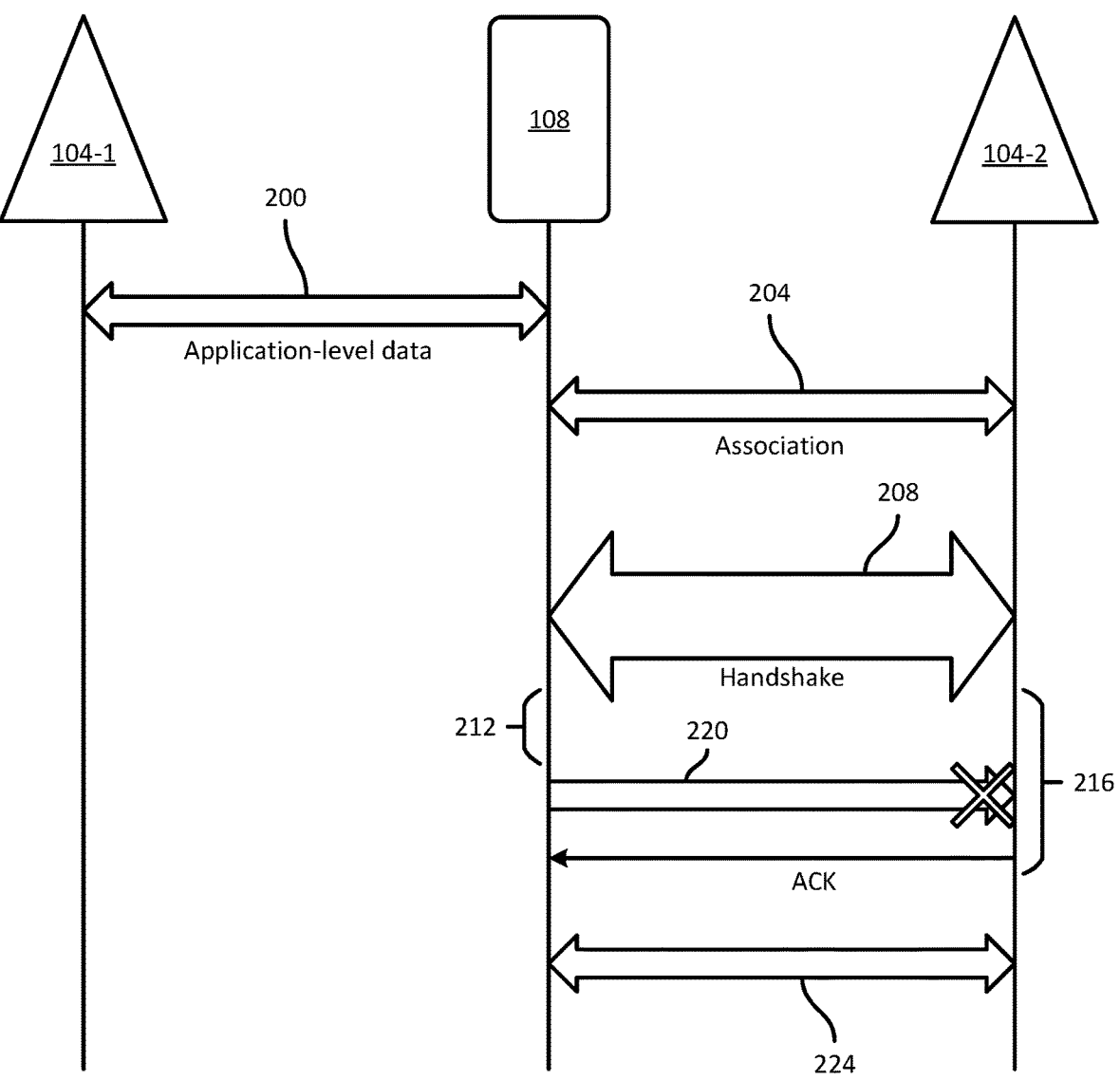
FIG. 2 is a sequence diagram illustrating a roaming process in the system of FIG. 1.

Turning to FIG. 2, an example roaming process is illustrated, in which the device 108 initially exchanges application data 200 with the AP 104-1, at a given MCS index (which may vary over time). When the device 108 roams to the AP 104-2, the device 108 establishes an association with the AP 104-2, e.g., via an exchange 204 that can include an association request to the AP 104-2 and an association response from the AP 104-2. Once the association is established, the device 108 and the AP 104-2 can perform a handshake 208 (e.g., a four-way handshake) to obtain one or more encryption keys such as a pairwise transient key (PTK, e.g., for encrypting unicast traffic) and a group temporal key (GTK, e.g., for encrypting broadcast or multicast traffic).

After the handshake 208 is complete, the device 108 and the AP 104-2 each install the resulting encryption key(s). In the illustrated example, the installation of key(s) at the device 108 consumes a first time period 212, and the installation of key(s) at the AP 104-2 consumes a second, longer, time period 216. The lengths of the time periods 212 and 216, as well as by other processes such as the handshake 208 are not shown to scale, but the time periods 212 and 216 may be of different lengths. In this case, the time period 216 is longer than the time period 212. For example, the device 108 may complete the installation of encryption key(s) in about 20 ms, while the AP 104-2 may complete the installation of encryption key(s) in about 90 ms. A wide variety of other time periods are also contemplated, including periods shorter than 20 ms, and periods longer than 90 ms.

The handshake 208 may not include a message indicating to the other device that key installation is complete. That is, the AP 104-2 may not communicate to the device 108 that the AP 104-2 has installed the encryption key(s) at the end of the time period 216. Further, the time periods 212 and 216 can vary widely, e.g., depending on computational load at each device and the like. The device 108 can be configured, once local key installation is complete (at the end of the time period 212), to resume transmission of application data 220. However, because the AP 104-2 has not yet completed key installation, the AP 104-2 may be prevented from processing the application data 220 for delivery to its destination (e.g., another client device, a server, or the like). The AP 104-2 may therefore send an acknowledgement (ACK) message to the device 108, but may also drop any packets of application data 220 received during the time period 216. Those packets may therefore not be delivered to their destinations, leading to packet retransmissions and/or reduced communications performance at the device 108. After key installation is complete at the AP 104-2, the exchange of application data 224 between the device 108 and the AP 104-2 can resume, including delivery of such application data to and from another endpoint not shown in FIG. 2.

The difference between the end of the time period 212 and the end of the time period 216 may be sufficiently long to negatively affect time-sensitive applications such as voice and/or video calls. The device 108 is therefore further configured, as discussed below, to implement a process to detect when the AP 104-2 has completed the installation of encryption keys derived during the handshake 208, in the absence of an explicit indication from the AP 104-2 that key installation is complete. The device 108 may therefore mitigate impacts (e.g., dropped packets) from delayed key installation at the AP 104-2.

Figure 3:
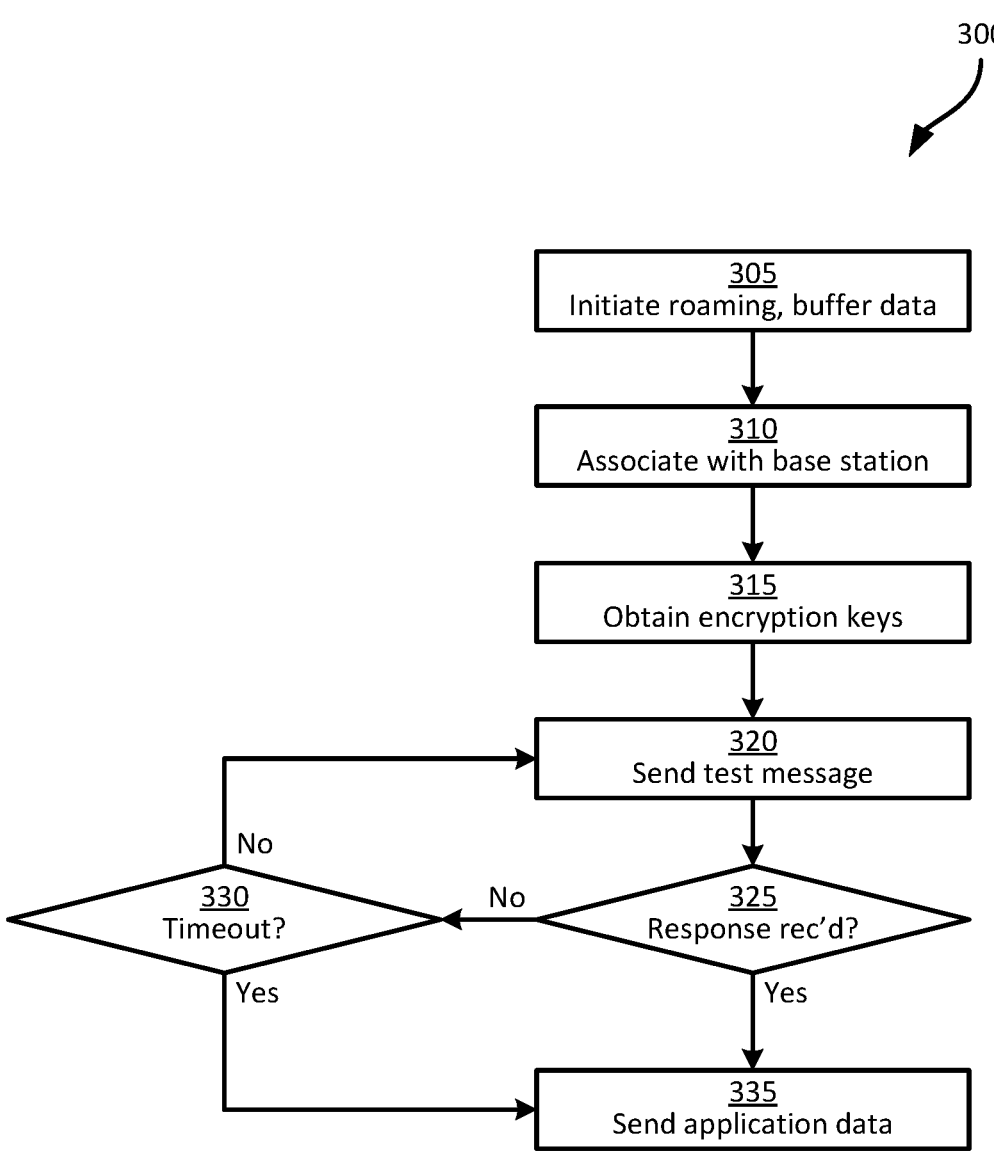
FIG. 3 is a flowchart of a method of base station state detection.

Turning to FIG. 3, a method 300 of base station state detection is illustrated. The method 300 is described below in conjunction with its example performance in the system 100, and in particular by the device 108.

At block 305, the device 108 is configured to initiate a roaming process, e.g., from the AP 104-1 to the AP 104-2 as noted above in connection with FIG. 1. For example, at block 305 the device 108 can detect a roam trigger, identify the AP 104-2 as a candidate for roaming, and make a decision to roam to the AP 104-2. When the roaming process is initiated at block 305, if the device 108 was engaged in a communication session such as a voice call, data transfer to a remote server (e.g., cloud storage), or the like, the device 108 is configured to buffer application data to be transmitted in the communication session. For example, in the case of a voice call, the device 108 is configured to buffer one or more packets of outgoing audio data, for transmission once the roaming process is complete.

At block 310, the device 108 is configured to establish an association with the AP 104-2. Establishing an association can include, for example, sending an association request from the device 108 to the AP 104-2, containing capabilities information such as the encryption modes and/or other features supported by the device 108. The AP 104-2 is then configured to send an association response to the device 108, e.g., containing an association identifier. The AP 104-2 can also be configured to store an identifier of the device 108 (e.g., a media access control (MAC) address, or the like). As will be apparent to those skilled in the art, while the association is established, the device 108 may accumulate further application data in the buffer mentioned above.

At block 315, in response to establishing an association with the AP 104-2, the device 108 can be configured to perform a handshake process 208 or other suitable mechanism to obtain one or more encryption keys, at block 315. The performance of block 315 can include, for example, a four-way handshake with the AP 104-2 to generate and store encryption keys including a PTK and a GTK, or any other suitable encryption key or set of encryption keys, according to the configuration of the network implemented by the APs 104 and the capabilities of the device 108. Upon completion of the handshake 208, the device 108 is configured to install the encryption key(s) derived via the handshake 208, e.g., by storing the key(s) in a protected memory component, adding the key(s) to a registry in association with an identifier of the AP 104-2, or the like.

When block 315 is complete and key installation at the device 108 is completed, rather than begin transmitting the application data that was buffered beginning at block 305, the device 108 is configured to attempt to detect whether key installation is also complete at the AP 104-2. At block 320, the device 108 is configured to send a test message to the AP 104-2. The test message does not include content (e.g., audio data, video data, web browsing data, or the like), but instead contains a payload that is distinct from the content (e.g., application data buffered beginning at block 305). The test message can therefore also be referred to as a non-content message, and the payload of the test message can also be referred to as non-content data. Further, the test message includes a request and/or command to the AP 104-2 that solicits a response from the AP 104-2 distinct from a generic acknowledgement (ACK) message. That is, while the AP 104-2 may send an acknowledgement, such as an ACK frame, to each frame that the device 108 transmits to the AP 104-2, the test message is selected such that the AP 104-2 is expected to also send a response message.

A variety of test messages are contemplated. For example, the test message can include an Address Resolution Protocol (ARP) message, such as an ARP request frame soliciting a response from the AP 104-2 containing a link layer address (e.g., a MAC address) corresponding to a given Internet layer address (e.g., an IP address). In other examples, the test message can include an Internet Control Management Protocol (ICMP) message such as a frame containing a ping (e.g., an echo request) or traceroute request. In further examples, the test message can include a frame or a set of frames defining a packet associated with the application 138. Such a test message, however, does not contain buffered application data from block 305. That is, the test message does not contain content such as audio data, video data, or the like. The payload of a test message associated with the application 138 can include a proprietary (e.g., specific to the application 138) flag or other indicator that causes the AP 104-2 or another endpoint (e.g., the other client device engaged in a voice call with the device 108) to return the same indicator, another indicator, or the like. The test message can be, but is not required to be, encrypted using one or more of the encryption key(s) obtained and installed at the device 108 at block 315.

At block 325, the device 108 is configured to determine, based on one or more messages received from the AP 104-2 after transmission of the test message at block 320, whether the AP 104-2 has completed installation of the encryption key(s) resulting from the handshake 208. The determination at block 325 can include determining whether a response, distinct from an ACK message, to the test message has been received. For example, the device 108 can determine at block 325 whether a response to an ARP request has been received from the AP 104-2, or whether a response to an ICMP request has been received from the AP 104-2. If such a response has been received, the AP 104-2 has completed key installation. If no response (beyond an ACK message) is received to the test message, the AP 104-2 may not yet have completed key installation.

The determination at block 325 can also include receiving inbound application data associated with the application 138, e.g., from the other endpoint in a voice call, from a remote server, or the like. When the AP 104-2 begins sending incoming application data to the device 108, that indicates that the AP 104-2 has completed key installation. The device 108 can therefore determine that the AP 104-2 has completed key installation even if the AP 104-2 has not yet responded to the test message from block 320.

When the determination at block 325 is negative, the device 108 can be configured to transmit a further test message, again without transmitting buffered application data. In the illustrated example, before sending a further test message, the device 108 is configured to determine at block 330 whether a predetermined timeout period has elapsed since the completion of block 315. For example, the device 108 can maintain the predetermined timeout period in memory, and start a timer when key installation at the device 108 is complete. The timeout period serves to interrupt the detection of AP state, e.g., in the event that test messages are filtered and/or discarded at the AP 104-2 even after the AP 104-2 has completed key installation. The timeout period can be selected to mitigate perceptible performance impacts on the application data 224, e.g., at about 150 ms (beyond which audible or visual distortion may result in a media stream). In other examples, the time period can be set shorter (e.g., about 100 ms) or longer (e.g., about 500 ms). A wide variety of other time periods can also be implemented.

When the determination at block 330 is negative, indicating that the timeout period has not yet expired, the device 108 returns to block 320 to send another test message. The timing of the test messages sent via repeated performances of block 320 can also be determined according to a predetermined sequence, frequency, or the like. For example, the device 108 can be configured to repeat block 320 at a predetermined interval (e.g., once every 10 ms, although shorter and longer time periods can be implemented in other examples) until the determination at block 325 or 330 is affirmative. In other examples, the device 108 can be configured to repeat block 320 at increasing intervals, e.g., with the first test message being sent upon completion of block 315, the second test message being sent 10 ms later, the third test message being sent after a further 30 ms, the fourth test message being sent after a further 50 ms (e.g., 90 ms after the completion of block 315), and so on. Various other sequences for test messages can also be implemented.

When the determination at block 325 is affirmative (e.g., when the device 108 has received a response to the test message, and/or inbound application data), or when the determination at block 330 is affirmative, the device 108 proceeds to block 335. At block 335, the device 108 is configured to begin sending the application data that was buffered beginning at block 305. In other words, at block 335, the roaming process is complete the exchange of application data 224 can resume. As a result of the base station state detection implemented by the device 108, the device 108 can mitigate data loss and/or the need for packet retransmissions when the exchange of application data 224 resumes, and can therefore also mitigate performance impacts of the roaming process on the application 138. That is, by buffering application data and using test messages to determine when the AP 104-2 is ready to process the application data 224, the device 108 can reduce or eliminate the number of packets of application data that are discarded by the AP 104-2 before the AP 104-2 has completed encryption key installation.

Figure 4:
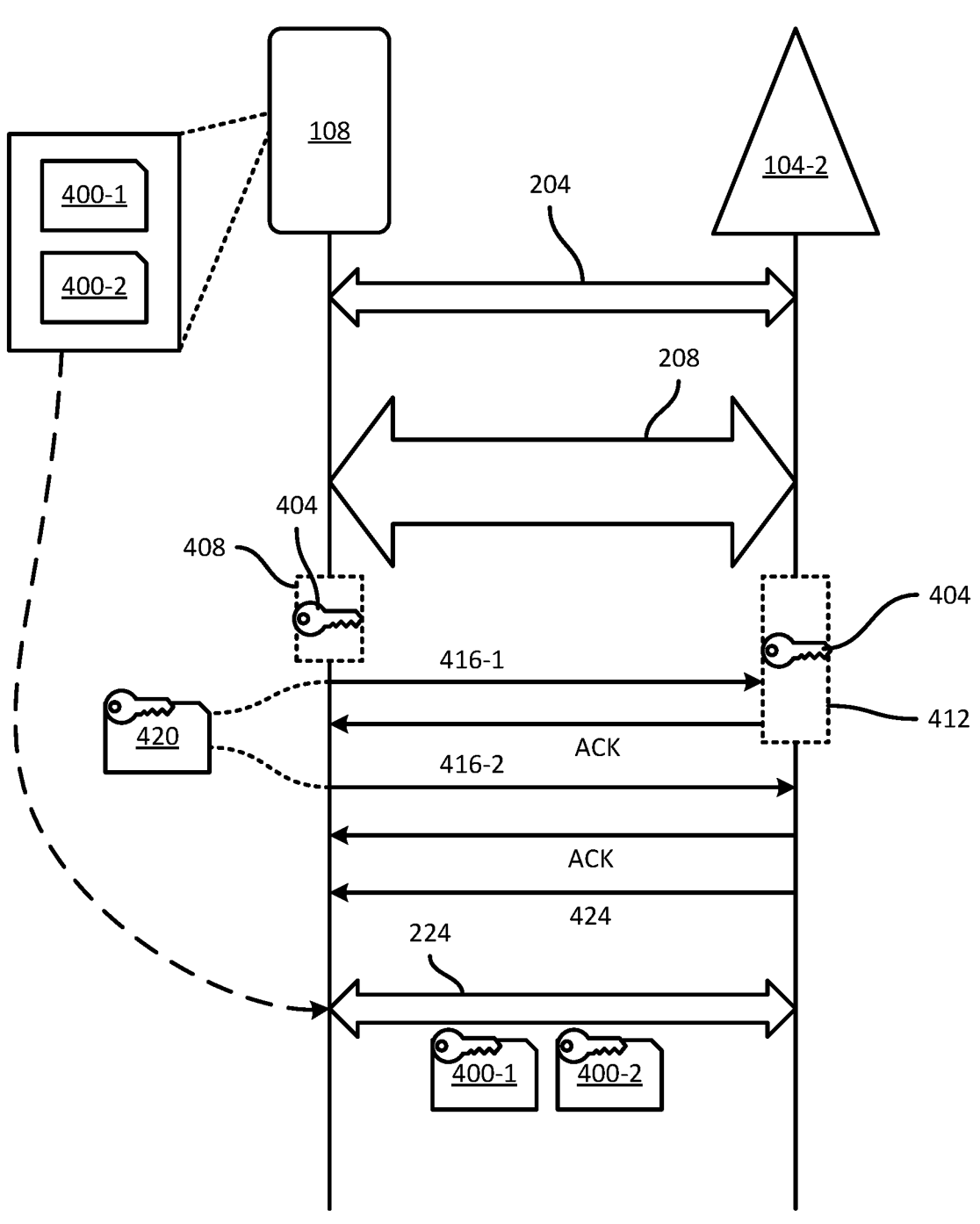
FIG. 4 is a sequence diagram illustrating an example performance of the method of FIG. 3.

Turning to FIG. 4, an example performance of the method 300 is illustrated. At block 305, the device 108 is shown buffering application data, e.g., in the form of packets 400-1 and 400-2 of voice data. The packets 400 can be stored in a memory at the communications interface 142, in the memory 134, or the like. At block 310, the device 108 and the AP 104-2 conduct the exchange 204 to establish an association between the device 108 and the AP 104-2. At block 315, the device 108 and the AP 104-2 conduct the handshake 208 to obtain one or more encryption keys. Following the handshake 208, the device 108 installs an encryption key 404 (as will be understood, there may also be more than one encryption key) during a time period 408. The AP 104-2, meanwhile, installs the key 404 during a time period 412, which is longer than the time period 408. The keys obtained by the device 108 and the AP 104-2 need not be the same, as illustrated.

At block 320, when key installation at the device 108 is complete, the device 108 is configured to send a test message 416-1. A payload 420 of the test message 416-1 can be encrypted, e.g., using the key 404. The first instance of the test message, as shown in FIG. 4, arrives at the AP 104-2 during the time period 412, and the AP 104-2 therefore responds only with an ACK. Because no further response is received to the test message 416-1, the device 108 sends a second test message 416-2 (e.g., with the same payload 420). In response to the second test message 416-2, the device 108 receives an ACK and a response 424. Therefore, at block 335, the device 108 resumes the exchange of application data 224, e.g., including sending the buffered packets 400-1 and 400-2, which can be encrypted with the key 404.

Figure 5:
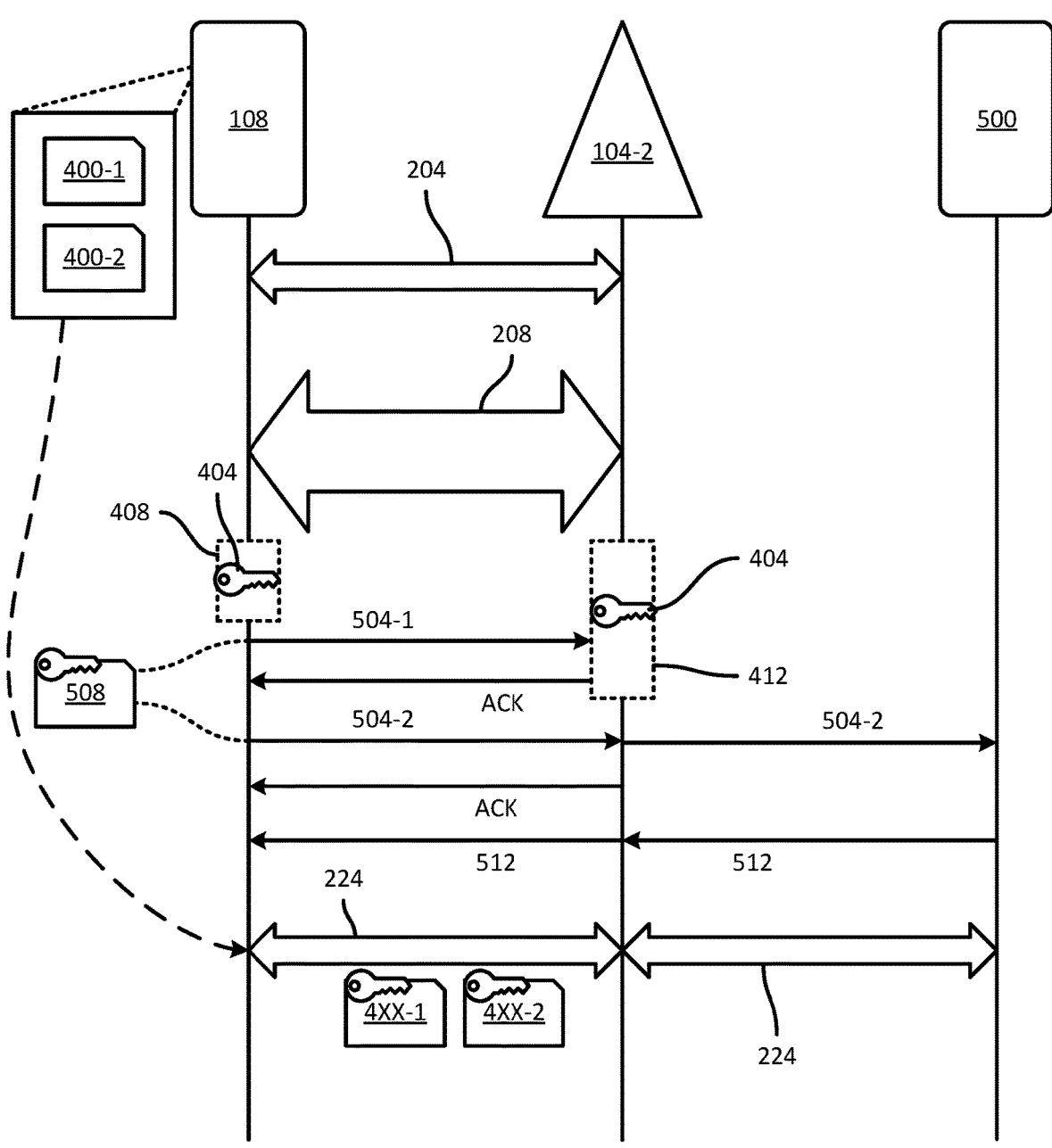
FIG. 5 is a sequence diagram illustrating another example performance of the method of FIG. 3.

Turning to FIG. 5, another embodiment is illustrated, in which test messages are addressed to another computing device 500, e.g., a peer such as the other endpoint of a voice call. In this example, the device 108 sends a first test message 504-1, which can include a payload 508 associated with the application 138. The payload 508 can include, for example, a flag, indicator, command, or the like, causing the device 500 to return a predetermined response. The device 108 does not receive a response to the first test message 508-1 (beyond an ACK message) because the AP 104-2 has not completed key installation, and therefore discards the test message 508-1 rather than delivering the test message to the device 500. The device 108 therefore sends a second test message 504-2, e.g., with the same payload 508. The second test message 504-2 is delivered to the device 500, which returns a response 512. Upon receipt of the response 512, the device 108 resumes the exchange of application data 224 with the device 500, via the AP 104-2.

In other examples, one or more of the test messages addressed to the other computing device 500 can include content data, e.g., voice data for an ongoing voice call. In such examples, the receipt of inbound content data from the other device 500 results in an affirmative determination at block 325. Such examples may result in the AP 104-2 discarding some content data, but the amount of such content data discarded may be limited by the throttled delivery of test messages sent via block 320. As noted earlier, a sequence of test messages may be divided by predetermined time periods, e.g., increasing over time.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a computing device, comprising:
    establishing an association with a base station;
    initiating a handshake with the base station to obtain an encryption key;
    prior to transmitting content data associated with an application executing at the computing device, transmitting a test message to the base station, the test message containing a payload distinct from the content data;
    determining, based on a message received from the base station after transmission of the test message, whether the base station has completed installation of the encryption key; and
    in response to determining that the base station has completed installation of the encryption key, transmitting the content data to the base station using the encryption key.

2. The method of claim 1, wherein the test message is encrypted using the encryption key.

3. The method of claim 1, further comprising:
    in response to obtaining the encryption key and prior to transmitting the test message, installing the encryption key at the computing device.

4. The method of claim 1, further comprising:

in response to determining that the base station has not completed installation of the encryption key, sending a further test message, and repeating the determination.

5. The method of claim 1, further comprising:

in response to determining that the base station has not completed installation of the encryption key, determining whether a timeout period has expired.

6. The method of claim 5, further comprising:

when the timeout period has expired, transmitting the content data to the base station using the encryption key.

7. The method of claim 1, wherein determining whether the base station has completed installation of the encryption key includes determining whether the message received from the base station contains a response to the test message payload.

8. The method of claim 1, wherein determining whether the base station has completed installation of the encryption key includes determining whether the message received from the base station contains payload data associated with the application.

9. The method of claim 1, wherein the test message is selected from the group consisting of:

an Address Resolution Protocol (ARP) message;

an Internet Control Message Protocol (ICMP) message; and a non-content message associated with the application, the non-content message containing a predetermined indicator.

10. The method of claim 1, wherein the base station includes at least one of a Wi-Fi access point, and a cellular base station.

11. A computing device, comprising:

a wireless communications interface; and a controller configured to:

establish an association with a base station;

initiate a handshake with the base station to obtain an encryption key;

prior to transmitting content data associated with an application executing at the computing device, transmit a test message to the base station, the test message containing a payload distinct from the content data;

determine, based on a message received from the base station after transmission of the test message, whether the base station has completed installation of the encryption key; and in response to determining that the base station has completed installation of the encryption key, transmit the content data to the base station using the encryption key.

12. The computing device of claim 11, wherein the test message is encrypted using the encryption key.

13. The computing device of claim 11, wherein the controller is further configured to:

in response to obtaining the encryption key and prior to transmitting the test message, install the encryption key at the computing device.

14. The computing device of claim 11, wherein the controller is further configured to:

in response to determining that the base station has not completed installation of the encryption key, send a further test message, and repeating the determination.

15. The computing device of claim 11, wherein the controller is further configured to:

in response to determining that the base station has not completed installation of the encryption key, determine whether a timeout period has expired.

16. The computing device of claim 15, wherein the controller is further configured to:

when the timeout period has expired, transmit the content data to the base station using the encryption key.

17. The computing device of claim 11, wherein the controller is configured to determine whether the base station has completed installation of the encryption key by determining whether the message received from the base station contains a response to the test message payload.

18. The computing device of claim 11, wherein the controller is configured to determine whether the base station has completed installation of the encryption key by determining whether the message received from the base station contains payload data associated with the application.

19. The computing device of claim 11, wherein the test message is selected from the group consisting of:

an Address Resolution Protocol (ARP) message;

an Internet Control Message Protocol (ICMP) message; and a non-content message associated with the application, the non-content message containing a predetermined indicator.

20. The computing device of claim 11, wherein the base station includes at least one of a Wi-Fi access point, and a cellular base station.

\* \* \* \* \*